No. 876,707. PATENTED JAN. 14, 1908.
A. F. FORD.
ROTARY ENGINE.
APPLICATION FILED APR. 8, 1907.
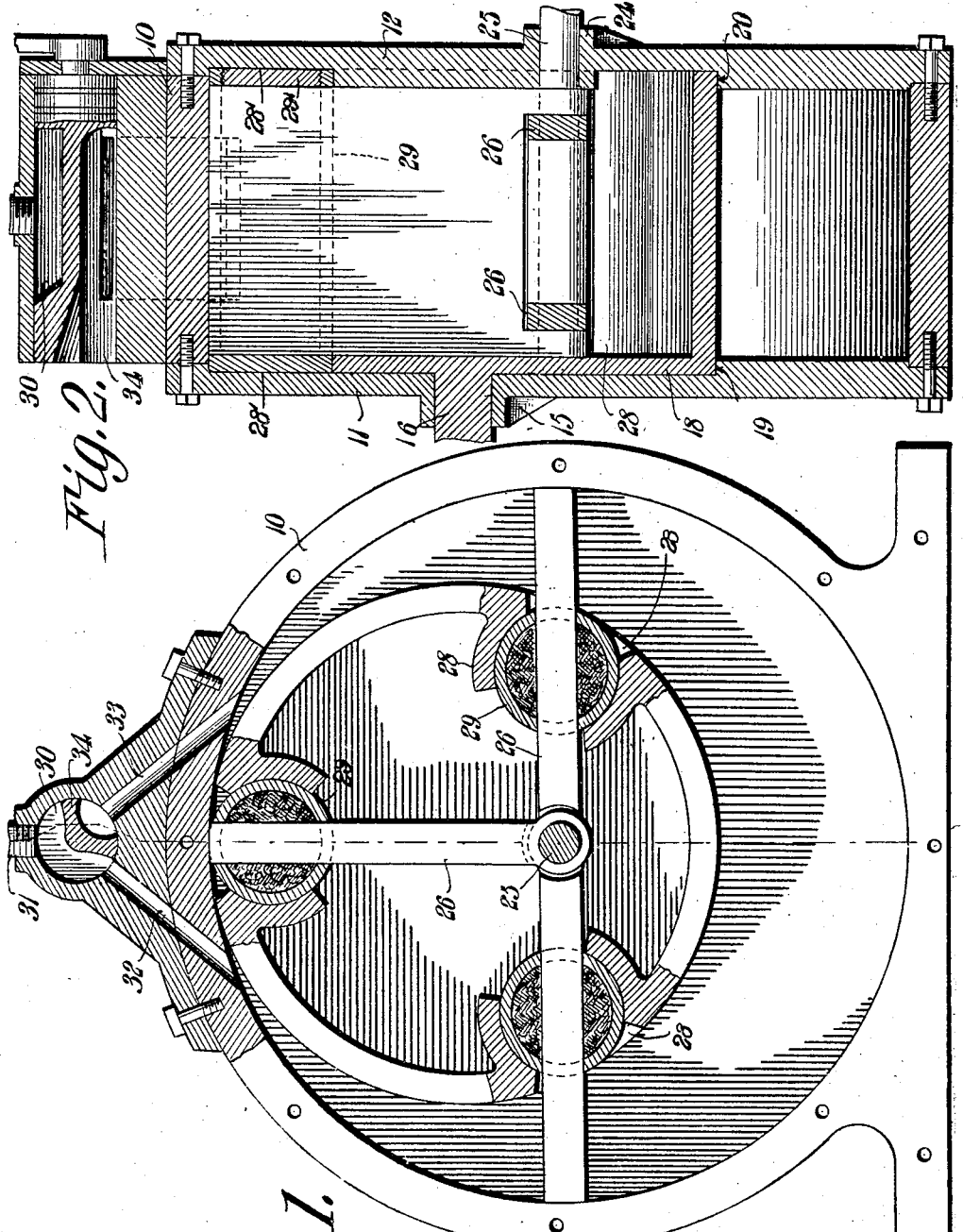
WITNESSES: Andrew F. Ford, INVENTOR
By C. A. Snow & Co.
ATTORNEYS

UNITED STATES PATENT OFFICE.

ANDREW F. FORD, OF WINONA, WASHINGTON.

ROTARY ENGINE.

No. 876,707.  Specification of Letters Patent.  Patented Jan. 14, 1908.

Application filed April 8, 1907. Serial No. 367,088.

*To all whom it may concern:*

Be it known that I, ANDREW F. FORD, a citizen of the United States, residing at Winona, in the county of Whitman and State of Washington, have invented a new and useful Rotary Engine, of which the following is a specification.

This invention relates to rotary engines, and has for its principal object to provide a novel form of engine of the movable piston wing type in which provision is made for preventing the passage of any of the actuating fluid to the interior of the main piston drum.

A further object of the invention is to provide a device of this type in which friction is reduced to a minimum, and the operating fluid utilized to the best advantage.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size and minor details of the structure may be made without departing from the spirit or sacrificing any of the advantages of the invention.

In the accompanying drawings:—Figure 1 is a vertical section of a rotary engine constructed in accordance with the invention. Fig. 2 is a transverse sectional view of the same on the line 2—2 of Fig. 1.

Similar numerals of reference are employed to indicate corresponding parts throughout the several figures of the drawings.

The cylinder 10 is cylindrical in form, and is provided with two heads 11 and 12 which are rigidly bolted to the body of the cylinder, and the heads are preferably provided with supporting feet as is also the cylinder, in order that the device may be readily secured to a suitable foundation or other support. Projecting from the head 11 is a bracket 15, which, in connection with a bearing in the head forms a support for a shaft 16, this shaft being the main shaft of the engine from which power may be transmitted. To the inner end of the shaft 16 is secured a piston drum 18, said drum being cylindrical in form, closed at one end and open at the other, its closed end fitting within a shallow recess 19 formed in the inner face of the head 11, while the open end fits within an annular groove 20 that is formed in the head 11, so that the two heads will form a support for the piston drum and prevent accidental displacement thereof and avoid undue strain on the main shaft.

To the outer face of the head 12 is secured a bracket 24, which, in connection with a bearing opening in the head 12, forms a support for a shaft 25, said shaft being arranged axially of the cylinder 10, and mounted on this shaft are three piston wings 26 all being free to turn on the shaft, and all of the wings extending on radial lines from the center to the inner circular wall of the cylinder.

The piston drum is provided at intervals with elongated slots 28 having curved walls arranged for the reception of rocking bearings 29 through which the piston wings extend, the bearings rocking freely in the slots in order to accommodate the eccentric position of the drum with respect to the cylinder. These rocking bearings are slotted at diametrically opposite points for a portion only of their lengths, each slot being of a length equal to the distance between the adjacent walls of the cylinder heads, and the piston wings are of a corresponding length, so that the end portions of the rocking bearings will extend into the recesses 28' formed in the inner faces of the cylinder heads and thus be supported by stationary portions of the cylinder.

In all engines of this general type considerable difficulty has been found in preventing the leakage of steam or other actuating fluid to the interior of the piston drum. In the present case by making these rocking bearings hollow, it is possible to introduce waste or packing of any kind, as shown in Figs. 1 and 3, and when the packing has thus been introduced it will be practically impossible for steam to pass to the interior of the drum, while at the same time by saturating the packing with a suitable lubricating material, friction and wear may be reduced to a minimum.

In order to introduce the packing into the rocking blocks each block is preferably provided at one end with a removable disk 29', as shown in Fig. 2, the periphery of the disk being threaded and fitting in a threaded opening at the end of the block in order that it may hold the packing in place.

At the top of the cylinder is arranged a valve chamber 30 from which leads a steam pipe 31, and from the valve chamber leads two ports 32 and 33, said ports communicating with the cylinder at points on opposite sides of the piston drum. In this chamber is a valve 34 having a suitable pocket at one side and the valve being readily turned for the purpose of placing either of the ports 32, 33 in communication with the steam port and the other with the exhaust port.

I claim:—

In a rotary engine, a stationary cylinder including opposite heads, a shaft extending through the central portion of one of the heads, a piston carrying shaft extending through the opposite head and disposed eccentrically thereto, the second head being provided with a circular recess struck from the center of the piston carrying shaft, and the first head having an annular groove concentric with said shaft, a drum piston secured to the piston carrying shaft and fitting in the recess and groove and in part supported by the walls thereof, the piston being provided with elongated slots extending from end to end thereof, the walls of the slots being curved, hollow rocking blocks mounted in the slots, said blocks being cylindrical in form and of a length equal to the width of the piston, the ends of said blocks fitting in the recess and the annular groove, and one end of each block being provided with a removable end plate, each block having a pair of diametrically opposed slots of a length less than that of the blocks, piston wings pivotally mounted on the first named shaft and extending through the slots of the blocks, and packing fitting within the hollow blocks and bearing against the sides of the piston wings, substantially as specified.

In testimony that I claim the foregoing as my own, I have hereto affixed my signature in the presence of two witnesses.

ANDREW F. FORD.

Witnesses:
   J. B. FERGUSON,
   C. H. EDE.